(12) United States Patent
Silva Figueiredo et al.

(10) Patent No.: US 11,790,204 B2
(45) Date of Patent: Oct. 17, 2023

(54) READ CURVED VISUAL MARKS

(71) Applicants: Hewlett-Packard Development Company, L.P., Spring, TX (US); Universidade Federal de Pernambuco, Recife (BR)

(72) Inventors: Lucas Silva Figueiredo, Recife (BR); João Marcelo Xavier Natario Teixeira, Recife (BR); João Paulo Silva do Monte Lima, Recife (BR); Lucas Oliveira Maggi, Recife (BR); Thiago de Menezes Chaves, Recife (BR); Francisco Paulo Magalhaes Simoes, Recife (BR); Lucas Valença Rocha Martins de Albuquerque, Recife (BR); Veronica Teichrieb, Recife (BR); Lucio Polese Cossio, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 137 days.

(21) Appl. No.: 17/262,245

(22) PCT Filed: Dec. 20, 2018

(86) PCT No.: PCT/US2018/066896
§ 371 (c)(1),
(2) Date: Jan. 22, 2021

(87) PCT Pub. No.: WO2020/131077
PCT Pub. Date: Jun. 25, 2020

(65) Prior Publication Data
US 2021/0303957 A1    Sep. 30, 2021

(51) Int. Cl.
| | | |
|---|---|---|
| G06K 7/14 | (2006.01) | |
| G06K 19/06 | (2006.01) | |
| G06K 1/12 | (2006.01) | |

(52) U.S. Cl.
CPC ....... *G06K 19/06037* (2013.01); *G06K 1/121* (2013.01); *G06K 7/1443* (2013.01); *G06K 7/1491* (2013.01); *G06K 19/06075* (2013.01)

(58) Field of Classification Search
CPC ....... G06K 19/06131; G06K 19/06075; G06K 7/1417; G06K 7/1456; G06K 7/1419
(Continued)

(56) References Cited

U.S. PATENT DOCUMENTS

| | | |
|---|---|---|
| 7,380,717 B2 | 6/2008 | Lubow |
| 7,412,089 B2 | 8/2008 | Squires et al. |

(Continued)

FOREIGN PATENT DOCUMENTS

| | | | |
|---|---|---|---|
| CN | 105046183 A | * | 11/2015 |
| CN | 105046184 A | | 11/2015 |

(Continued)

OTHER PUBLICATIONS

Machine translation of CN-105046183-A, Chen W., Nov. 2015, pp. 1-17 (Year: 2015).*

(Continued)

*Primary Examiner* — Paultep Savusdiphol
(74) *Attorney, Agent, or Firm* — Michael Dryja

(57) ABSTRACT

According to examples, an apparatus may include a processor and a non-transitory computer readable medium on which is stored instructions that may cause the processor to create a 2D reference mesh for an image of a curved visual mark, establish correspondences between finder pattern points in the curved visual mark and points of the 2D reference mesh, and determine a curved 3D mesh having a (Continued)

radius that results in a minimal reprojection error of a projective transform estimated for correspondences between the 2D reference mesh and the curved 3D mesh while the radius remains below a predefined upper limit. The instructions may also cause the processor to sample components of the curved visual mark in elements of the determined curved 3D mesh to form a 2D planar image of the curved visual mark and analyze the 2D planar image of the curved visual mark to read the curved visual mark.

20 Claims, 12 Drawing Sheets

(58) Field of Classification Search
USPC .......................................... 235/462.1, 462.09
See application file for complete search history.

(56) References Cited

U.S. PATENT DOCUMENTS

| | | | |
|---|---|---|---|
| 8,881,986 | B1 | 11/2014 | Dhua et al. |
| 9,087,253 | B2 | 7/2015 | Zhang et al. |
| 9,227,323 | B1* | 1/2016 | Konolige ................ H04N 5/33 |
| 9,710,688 | B2 | 7/2017 | Sugaya |
| 9,805,296 | B2 | 10/2017 | Loy et al. |
| 2003/0047612 | A1 | 3/2003 | Shaked et al. |
| 2005/0150957 | A1* | 7/2005 | Lubow ................ G06K 7/1473 |
| | | | 235/462.01 |
| 2007/0228171 | A1 | 10/2007 | Thiyagarajah |
| 2017/0046548 | A1 | 2/2017 | Kamijo et al. |
| 2017/0232773 | A1 | 8/2017 | Kamijo et al. |
| 2018/0157946 | A1 | 6/2018 | Landry et al. |

FOREIGN PATENT DOCUMENTS

| | | |
|---|---|---|
| EP | 0999519 A1 | 5/2000 |
| EP | 1383074 A1 | 1/2004 |
| KR | 20130115054 A | 10/2013 |
| WO | WO-2018209886 A1 | 11/2018 |

OTHER PUBLICATIONS

H. Y. Wu et al "Mean-Value Laplacian Coordinates for Triangular Meshes," (CGIV'06), 2006, pp. 156-160.

Lay et al. "Decoding of QR codes printed onspheres." Next-Generation Electronics (ISNE), 5th International Symposium on. IEEE, 2016, 3 pages.

Lay et al. "Perspective projection for decoding of QR codes posted on cylinders." (ICSIPA), 2017 IEEE International Conference on. IEEE, 2017, pp. 39-42.

Lay et al. "Rectification of images of QR codes posted on cylinders by conic segmentation." (ICSIPA), 2015 IEEE International Conference on. IEEE, 2015, 389-393.

Lay et al. "Rectification of QR-code images using the parametric cylindrical surface model." (ISNE), IEEE, 2015, 5 pages.

Lepetit, V., Moreno-Noguer, F. and Fua, P., 2009. EPnP: An Accurate O(n) Solution to the PnP Problem. International Journal of Computer Vision, 81, pp. 155-166.

Li, Xiaochao, et al. "Reconstruct algorithm of 2D barcode for reading the QR code on cylindrical surface." Anti-Counterfeiting, Security and Identification (ASID), 2013 IEEE International Conference on. IEEE, 2013, 5 pages.

Ngo et al. "Template-based monocular 3D shape recovery using laplacian meshes." IEEE Transactions on Pattern Analysis and Machine Intelligence, v. 38, n. 1, p. 172-187, 2016.

* cited by examiner

READ CURVED VISUAL MARKS

BACKGROUND

Visual marks, such as quick release (QR) codes, watermarks, and barcodes, may be provided on various physical objects, such as documents and other products. The visual marks may represent code that may provide information regarding the physical objects to which the visual marks are provided or other information. For instance, the visual marks may represent code that may be used for identification of the physical objects and/or for tracking the physical objects. In other examples, the visual marks may represent code that may be used to direct users to particular websites or to provide information regarding a product or service to users.

BRIEF DESCRIPTION OF THE DRAWINGS

Features of the present disclosure are illustrated by way of example and not limited in the following figure(s), in which like numerals indicate like elements, in which.

DETAILED DESCRIPTION

A visual code, such as a barcode, a QR code, or the like, may be printed or attached to various surfaces. The surfaces on which the visual codes may be provided may be flat or may be curved or deformed. In instances in which the surfaces are flat, the visual codes may easily be identified and the information represented by the visual codes may easily be read. However, in instances in which the surfaces are curved or deformed, the visual code may also be curved or deformed, which may make it more difficult for the visual code to be identified and read.

Disclosed herein are apparatuses and methods for reading curved and/or deformed visual codes, which are also referenced herein as marks. Particularly, a processor of an apparatus disclosed herein may execute instructions that may process an image of curved or deformed visual code to render the code that the visual code represents to accurately be read. The processor may execute one of the sets of instructions disclosed herein or may execute a plurality of the sets of instructions disclosed herein to process and read the visual code.

Through implementation of the apparatuses and methods disclosed herein, visual codes printed or otherwise provided on curved or deformed surfaces may accurately be read. In one regard, the accurate reading of the visual codes afforded through implementation of the apparatuses and methods disclosed herein may enable the visual codes to be provided on a large number of variously shaped objects. As a result, the use of visual codes, which are used in a number of different applications, may be expanded to additional applications, which may increase the usefulness of the visual codes. In addition, the accurate reading of the visual codes may reduce processing resource consumption as, for instance, multiple operations to read the visual codes may be reduced or eliminated.

Before continuing, it is noted that as used herein, the terms "includes" and "including" mean, but is not limited to, "includes" or "including" and "includes at least" or "including at least." The term "based on" means "based on" and "based at least in part on."

Figure 1:
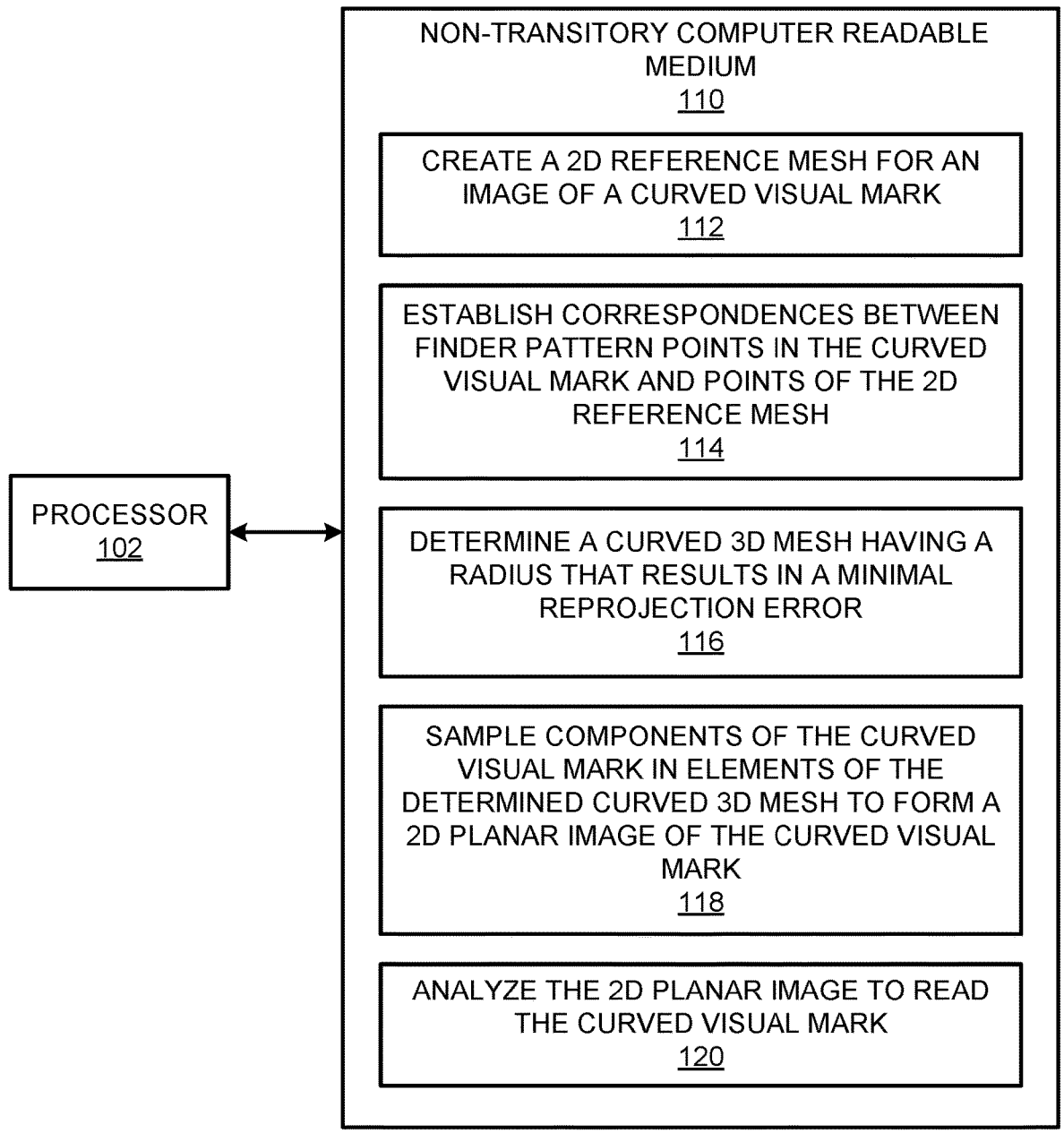
FIG. 1 shows a diagram of an example apparatus that may process an image of a curved visual mark to read information encoded in the curved visual mark.
Figure 2A:
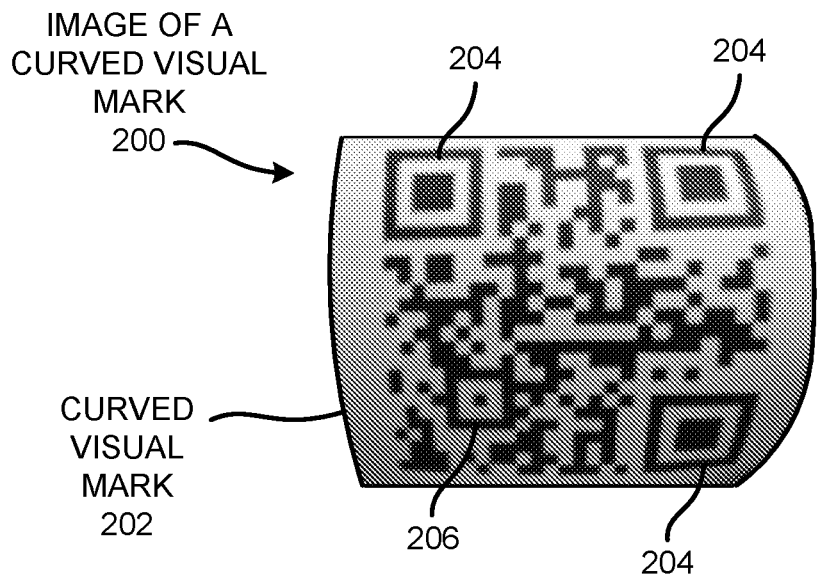
FIG. 2A shows a diagram of an example image of a curved visual mark.
Figure 2B:
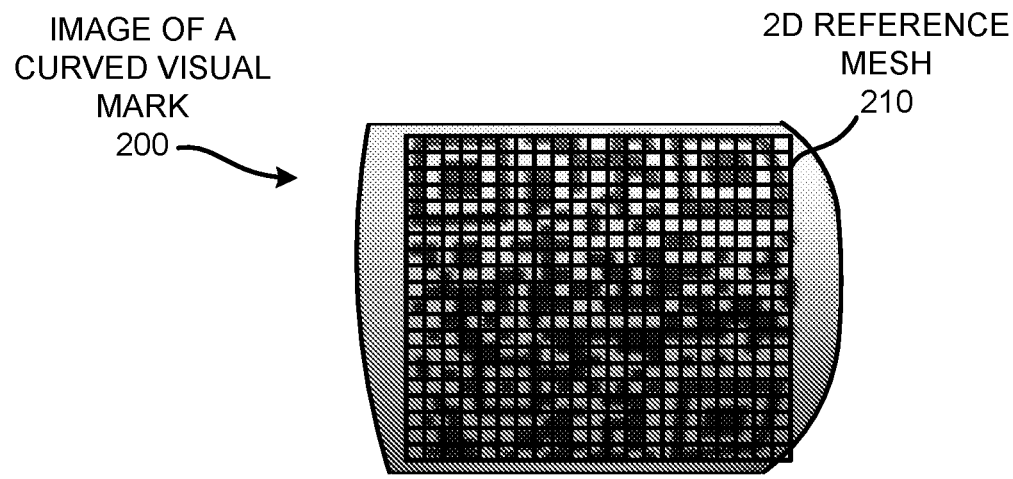
FIG. 2B shows a diagram of an example 2D reference mesh overlaying the example image depicted in FIG. 2A.

Reference is first made to FIGS. 1, 2A, and 2B. FIG. 1 shows a block diagram of an example apparatus 100 that may process an image 200 of a curved visual mark 202 to read information encoded in the curved visual mark 202. FIG. 2A shows a diagram of an example image 200 of a curved visual mark 202 and FIG. 2B shows a diagram of an example 2D reference mesh 210 overlaying the example image 200 depicted in FIG. 2A. It should be understood that the apparatus 100 depicted in FIG. 1, the image 200 of the curved visual mark 202 depicted in FIG. 2A, and/or 2D reference mesh 210 depicted in FIG. 2B may include additional components and that some of the components described herein may be removed and/or modified without departing from the scopes of the apparatus 100, the image 200 of the curved visual mark 202, and/or the 2D reference mesh 210 disclosed herein.

The apparatus 100 may be a computing apparatus, e.g., a personal computer, a laptop computer, a tablet computer, a smartphone, a server computer, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), a graphics processing unit (GPU), and/or other hardware device. The apparatus 100 may also include a non-transitory computer readable medium 110 that may have stored thereon machine readable instructions 112-120 (which may also be termed computer readable instructions) that the processor 102 may execute. The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

According to examples in which the curved visual mark 202 is a curved quick response (QR) code as shown in FIG. 2A, the curved visual mark 202 may include a plurality of finder patterns 204. The curved visual mark 202 may have a rounded or a cylindrical curvature. In a flat version of the curved visual mark 202, the finder patterns 204 may have the same patterns and sizes with respect to each other and may be positioned at or near the edges of the QR code. The finder patterns 204 may thus define the boundaries of the QR code. In addition, each of the finder patterns 204 may include a smaller square element surrounded by a larger square element, with a gap between the elements. In some examples, the QR code may also include an alignment pattern 206 positioned near a corner of the QR code at which the finder patterns 204 are not provided. The alignment pattern 206 may also include a smaller square element surrounded by a larger square element, with a gap between the elements. The QR code may further include patterns that may represent or encode various information.

The processor 102 may fetch, decode, and execute the instructions 112 to create a two-dimensional (2D) reference mesh 210 (FIG. 2) for the image 200 of the curved visual mark 202. The 2D reference mesh 210 may correspond to a flat version of the visual mark 202. In addition, the processor 102 may create the 2D reference mesh 210 based on detected finder patterns 204 in the curved visual mark 202. For instance, the processor 102 may detect the finder patterns 204 in the image 200 through a suitable detection technique, such as contour detection and checking of the quad geometries of the finder patterns 204, by scanlines over the image 200 to identify the finder patterns 204, or the like.

According to examples, the processor 102 may detect the finder patterns 204 of the curved visual mark 202 by applying a threshold on the image 200 to make the features in the image 200 that are below a certain threshold white and the features in the image 200 that are above the certain threshold black, or vice versa. In addition, the processor 102 may find contours in the image 200 following application of the threshold and storing points that are part of a contour. The processor 102 may determine patterns in the contour and may identify the patterns that have the finder pattern 204 shapes to find the locations of the finder patterns 204.

The processor 102 may also estimate a N×N grid size of the curved visual mark 202 based on the detected finder patterns 204. For instance, the processor 102 may detect the sizes of the finder patterns 204 in the image 200 and based on the detected sizes, the processor 102 may determine the distances between the finder patterns 204. In addition, the processor 102 may estimate the N×N grid size of the curved visual mark 202 based on the detected finder patterns, e.g., the determined distances between the finder patterns 204. That is, for instance, the processor 102 may estimate the N×N grid size to be within or equal to the boundaries of the curved visual mark 202 as determined from the locations of the finder patterns 204 with respect to each other. The processor 102 may create the 2D reference mesh 210 to have a size that may correspond to the estimated N×N grid size.

The processor 102 may also initiate a projective transform, e.g., that may be a 3×4 projective transform that contain only zeros, and may identify a best projective transform error that may be as big as the image 200. The processor 102 may store the identified best projective transform error as a current best projective transform error.

The processor 102 may fetch, decode, and execute the instructions 114 to establish correspondences between points, e.g., corners, of each of the finder patterns 204 in the curved visual mark 202 and points of the 2D reference mesh 210. For instance, the processor 102 may calculate coordinate positions of the finder pattern 204 corners with respect to points, e.g., vertices or intersections of the horizontal and vertical lines of the 2D reference mesh 210. By way of example, the processor 102 may relate each of the corners of the finder patterns 204 to coordinates of the 2D reference mesh 210.

The processor 102 may fetch, decode, and execute the instructions 116 to determine a curved three-dimensional (3D) mesh having a radius that results in a minimal reprojection error of a projective transform estimated for correspondences between the 2D reference mesh and the curved 3D mesh while the radius remains below a predefined upper limit. The predefined upper limit may be defined as a radius that is sufficiently large to be near a flat surface. In some examples, the predefined upper limit may be a radius that results in a flat surface. In other examples, the predefined upper limit of the radius may be determined through testing, simulations, etc. Various operations that the processor 102 may execute to determine the curved 3D mesh are described in greater detail herein below.

The processor 102 may fetch, decode, and execute the instructions 118 to sample components of the curved visual mark 202 in elements of the determined curved 3D mesh to form a 2D planar image of the curved visual mark 202. That is, for instance, the processor 102 may sample the square elements of the curved visual mark 202 based on the curved 3D mesh having a radius that resulted in the minimal reprojection error and may form the 2D planar image from that curved 3D mesh.

The processor 102 may fetch, decode, and execute the instructions 120 to analyze the 2D planar image of the curved visual mark 202 to read the curved visual mark 202. For instance, the processor 102 may identify the locations of the visual mark squares in the 2D planar image of the curved visual mark 202 and may determine the information represented by the visual mark squares based on the locations of the squares.

Figure 3:
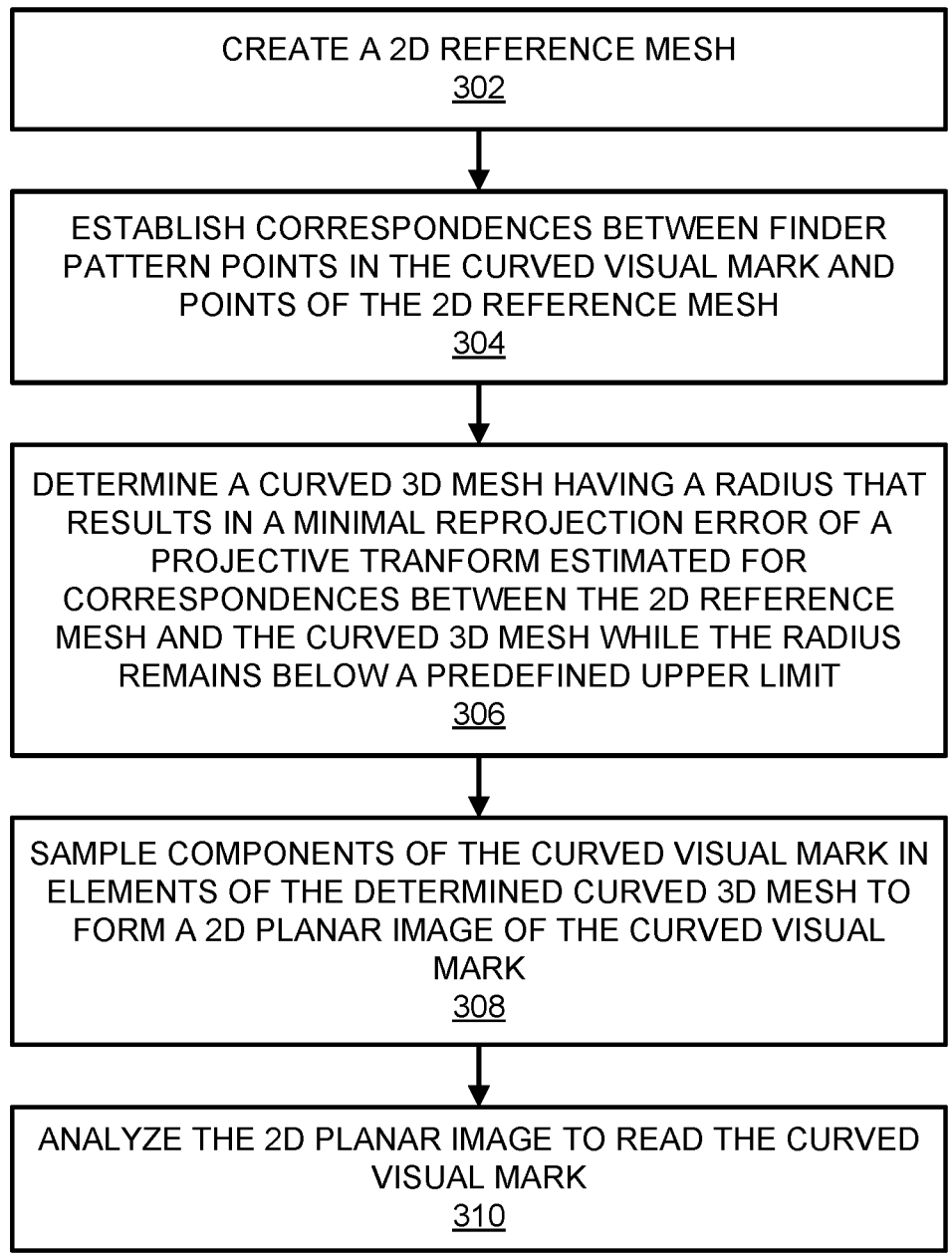
FIG. 3 shows an example method for processing an image of a curved visual mark to read information encoded in the curved visual mark.
Figure 4A:
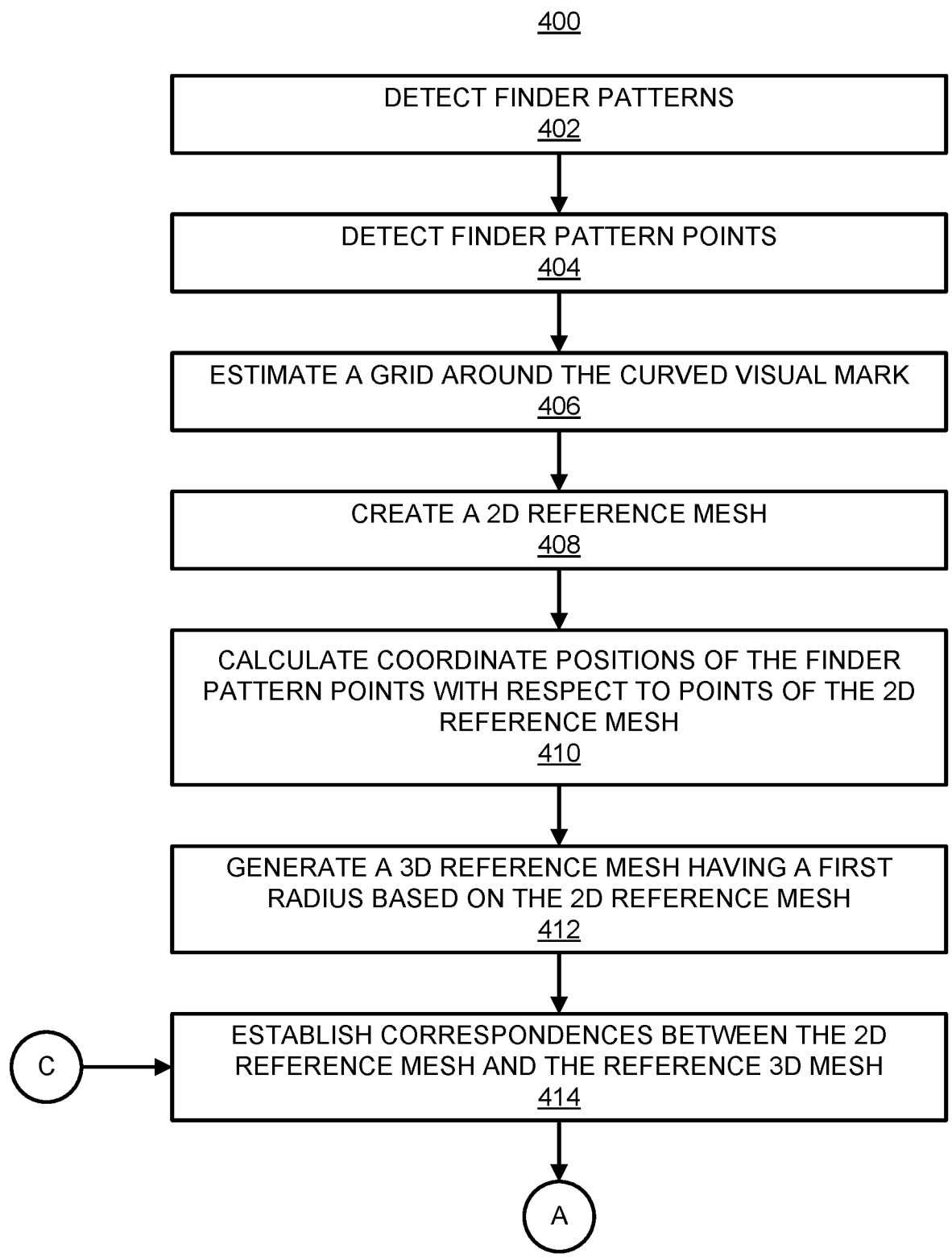
FIGS. 4A-4C, collectively, depict an example method for determining a curved 3D mesh having a radius that results in a minimal reprojection error for use in reading a curved visual mark.
Figure 4B:
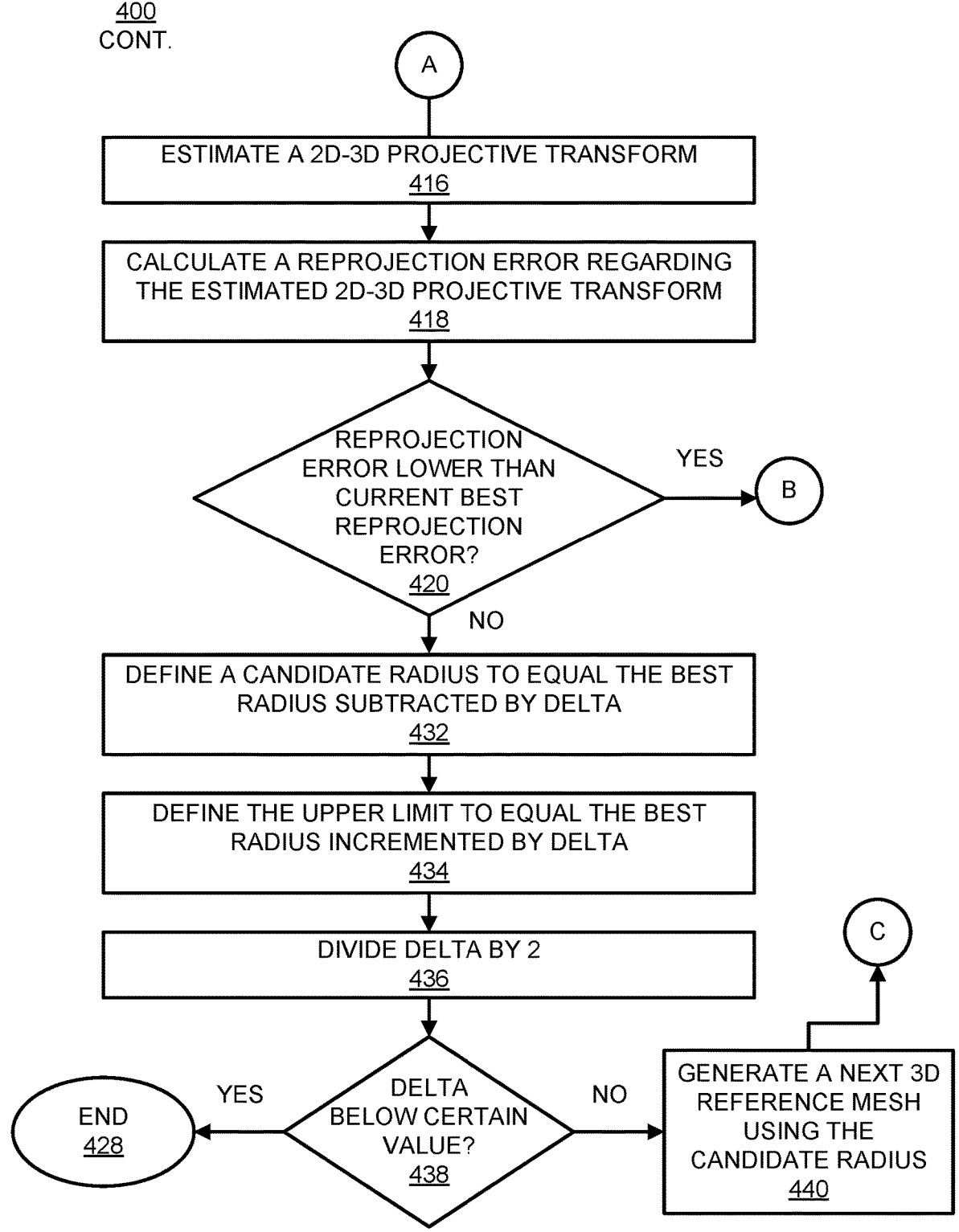
Figure 4C:
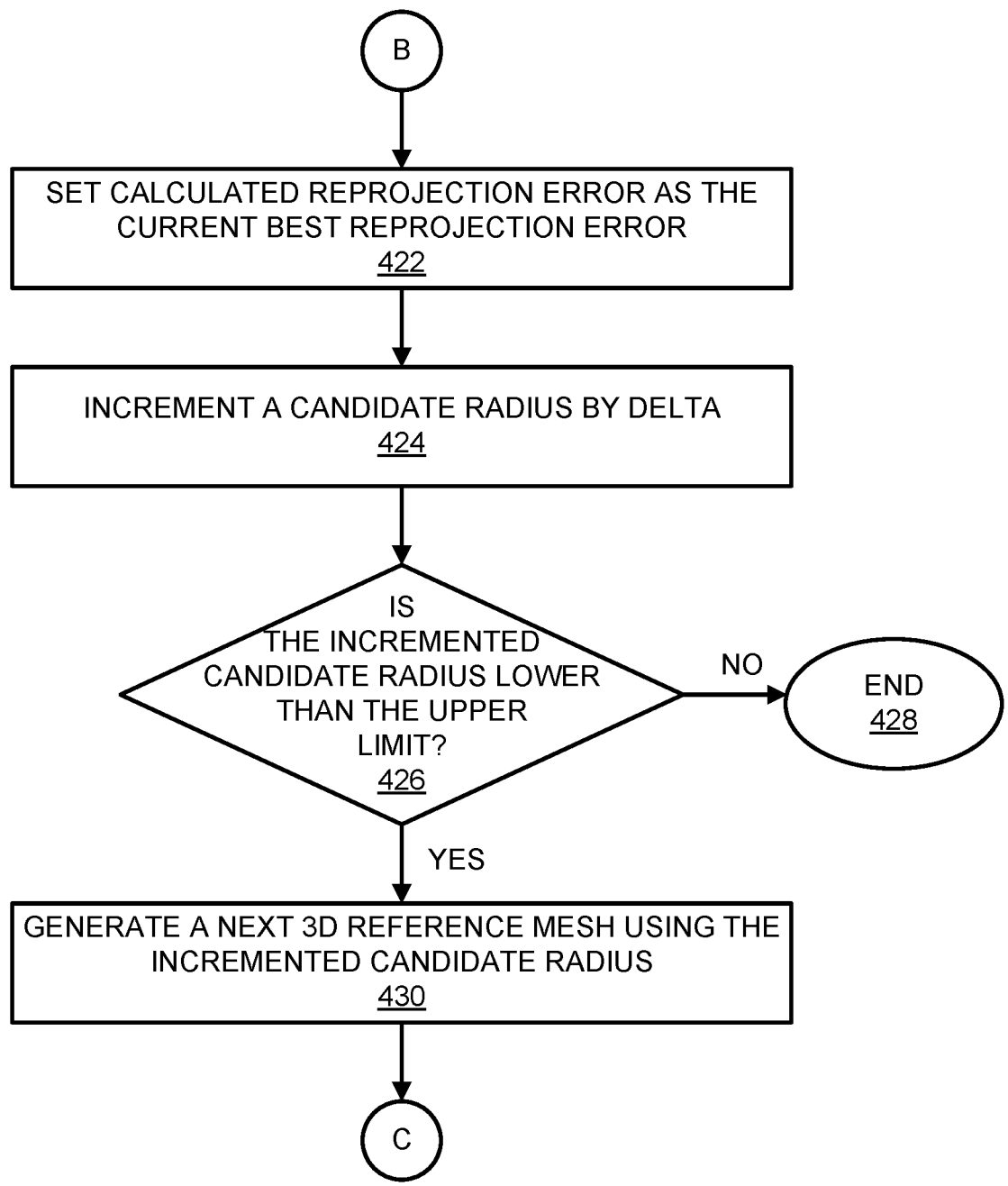

Various manners in which the processor 102 may be implemented are discussed in greater detail with respect to the methods 300 and 400 depicted in FIGS. 3 and 4A-4C. Particularly, FIG. 3 depicts an example method 300 for processing an image 200 of a curved visual mark 202 to read information encoded in the curved visual mark 202. FIGS. 4A-4C, collectively, depict an example method 400 for determining a curved 3D mesh having a radius that results in a minimal reprojection error for use in reading a curved visual mark 202. It should be apparent to those of ordinary skill in the art that the methods 300 and 400 may represent generalized illustrations and that other operations may be added or existing operations may be removed, modified, or rearranged without departing from scopes of the methods 300 and 400.

The descriptions of the methods 300 and 400 are made with reference to the apparatus 100 illustrated in FIG. 1 as well as to the features depicted in FIGS. 2A and 2B for purposes of illustration. It should be understood that apparatuses having configurations other than that shown in FIG. 1 may be implemented to perform the methods 300 and/or 400 without departing from scopes of the methods 300 and/or 400. In addition, the method 400 may be related to the method 300 in that the method 400 may include more detailed operations for blocks 302-304 in the method 300.

At block 302, the processor 102 may create a two-dimensional (2D) reference mesh 210 for an image 200 of a curved visual mark 202. At block 304, the processor 102 may establish correspondences between finder pattern 204 points in the curved visual mark 202 and points, e.g., vertices, of the 2D reference mesh 210. At block 306, the processor 102 may determine a curved three-dimensional (3D) mesh having a radius that results in a minimal reprojection error of a projective transform estimated for correspondences between the 2D reference mesh 210 and the curved 3D mesh while the radius remains below a predefined upper limit. At block 308, the processor 102 may sample components of the curved visual mark 202 in elements of the determined curved 3D mesh to form a 2D planar image of the curved visual mark 202. At block 310, the processor 102 may analyze the 2D planar image of the curved visual mark 202 to read the curved visual mark 202.

Turning now to FIGS. 4A-4C, and particularly to FIG. 4A, at block 402, the processor 102 may detect finder patterns 204 in an image 200 of a curved visual mark 202. The processor 102 may detect the finder patterns 204 in any of the manners discussed herein. At bock 404, the processor 102 may detect points of the finder patterns 204. For instance, the processor 102 may detect the corners of the detected finder patterns 204.

At block 406, the processor 102 may estimate a grid around the curved visual mark 202, for instance, as discussed herein. At block 408, the processor 102 may create a 2D reference mesh 210, for instance, as discussed herein. At block 410, the processor 102 may calculate coordinate positions of the finder pattern 204 points with respect to points of the 2D reference mesh 210. For instance, the processor 102 may determine the intersections of the 2D reference mesh 210 to which the corners of the finder patterns 204 are the closest.

At block 412, the processor 102 may generate a 3D reference mesh based on the 2D reference mesh, the 3D reference mesh having a first radius. The 3D reference mesh may have a curved profile and may have a size that corresponds to the size of the 2D reference mesh 210. The 3D reference mesh may also include lines that are spaced apart at similar distances as the 2D reference mesh 210.

At block 414, the processor 102 may establish correspondences between the 2D reference mesh 210 and the 3D reference mesh. That is, for instance, the processor 102 may determine correspondences between respective intersection points, e.g., vertices, of the 2D reference mesh 210 and the 3D reference mesh. The correspondences may relate to the distances between the respective intersection points of the 2D reference mesh 210 and the 3D reference mesh along a particular direction. In one regard, because the 3D reference mesh may be created using coordinates of the 2D reference mesh 210 as input, the correspondences between the respective intersections may be known a priori.

At block 416, the processor 102 may estimate a 2D-3D projective transform from the established correspondences between the 2D reference mesh 210 and the 3D reference mesh. For instance, the processor 102 may use sixteen 2D-3D correspondences found between the 2D reference mesh 210 and the 3D reference mesh having the first radius, e.g., as may be represented by the cylinder, at block 412. The sixteen 2D-3D correspondences found between the 2D reference mesh 210 and the 3D reference mesh may include four correspondences from each of the three finder patterns 204 and four correspondences from the alignment pattern 206. In addition, the processor 102 may estimate the 2D-3D projective transform through application of a perspective-n-point (PnP) method that may estimate the pose of a calibrated camera given a set of n 3D points and their corresponding 2D projections in an image. By way of particular example, the processor 102 may apply an Efficient perspective-n-point (EPnP) camera pose estimation to estimate the 2D-3D projective transform of the 2D reference mesh 210 and the 3D reference mesh.

At block 418 (FIG. 4B), the processor 102 may calculate a reprojection error regarding the estimated 2D-3D projective transform. The processor 102 may calculate the reproduction error based on a summation of the distances of the projected 3D points of the 3D reference mesh to their corresponding 2D points of the 2D reference mesh given by the previously detected finder pattern 204 corners.

At block 420, the processor 102 may determine whether the calculated reprojection error is lower than a current best projection error. During an initial iteration of the method 400, the best projection error may be equivalent to the projective transform error that may be as big as the image 200 as discussed above.

Based on a determination that the calculated reprojection error is lower than the current best projection error, at block 422 (FIG. 4C), the processor 102 may set the calculated reprojection error as the current best reprojection error. At block 424, the processor 102 may increment a candidate radius by a predefined value (delta). The predefined value may be based on empirical testing, through simulations, and/or the like. At block 426, the processor 102 may determine whether the incremented candidate radius is lower than a predefined upper limit. Based on a determination that the incremented candidate radius is not lower than the upper limit, the method 400 may end as indicated at block 428. In addition, the processor 102 may sample the components of the curved visual mark in elements of the determined curved 3D mesh having the current lowest radius to form the 2D planar image of the curved visual mark 202 as discussed herein with respect to block 308.

However, based on a determination that the incremented candidate radius is lower than the upper limit, at block 430, the processor 102 may generate a next reference 3D mesh using the candidate radius incremented at block 424. In addition, the processor 102 may repeat blocks 414-430 until the incremented candidate radius is not lower than the upper limit at block 426 or delta is below a certain value as discussed below with respect to block 438.

With reference back to block 420 (FIG. 4B), based on a determination that the reprojection error calculated at block 418 is not lower than the current best reprojection error, at block 432, the processor 102 may define a candidate radius to equal the radius corresponding to the current best reprojection error subtracted by the predefined value (delta). In some examples, the delta may be equivalent to the delta discussed above with respect to block 424, while in other examples, the delta at block 432 may differ from the delta at block 424.

At block 434, the processor 102 may define the upper limit to equal the radius corresponding to the current best reprojection error (e.g., the best radius), incremented by delta. At block 436, the processor 102 may divide delta by two. In addition, at block 438, the processor 102 may determine whether delta divided by two is below a certain value. The certain value may be determined empirically and may correspond to an acceptably small reprojection error. By way of particular example, the certain value may be an average of 5 pixels or less. Based on a determination that delta is below the certain value, the method 400 may end as indicated at block 428. However, based on a determination that delta is not below the certain value, at block 440, the processor 102 may generate a next reference 3D mesh using the candidate radius defined at block 432. In addition, the processor 102 may repeat blocks 414-440 until the incremented and/or defined candidate radius is not lower than the upper limit at block 426 or delta is below the certain value as discussed with respect to block 438.

Figure 5:
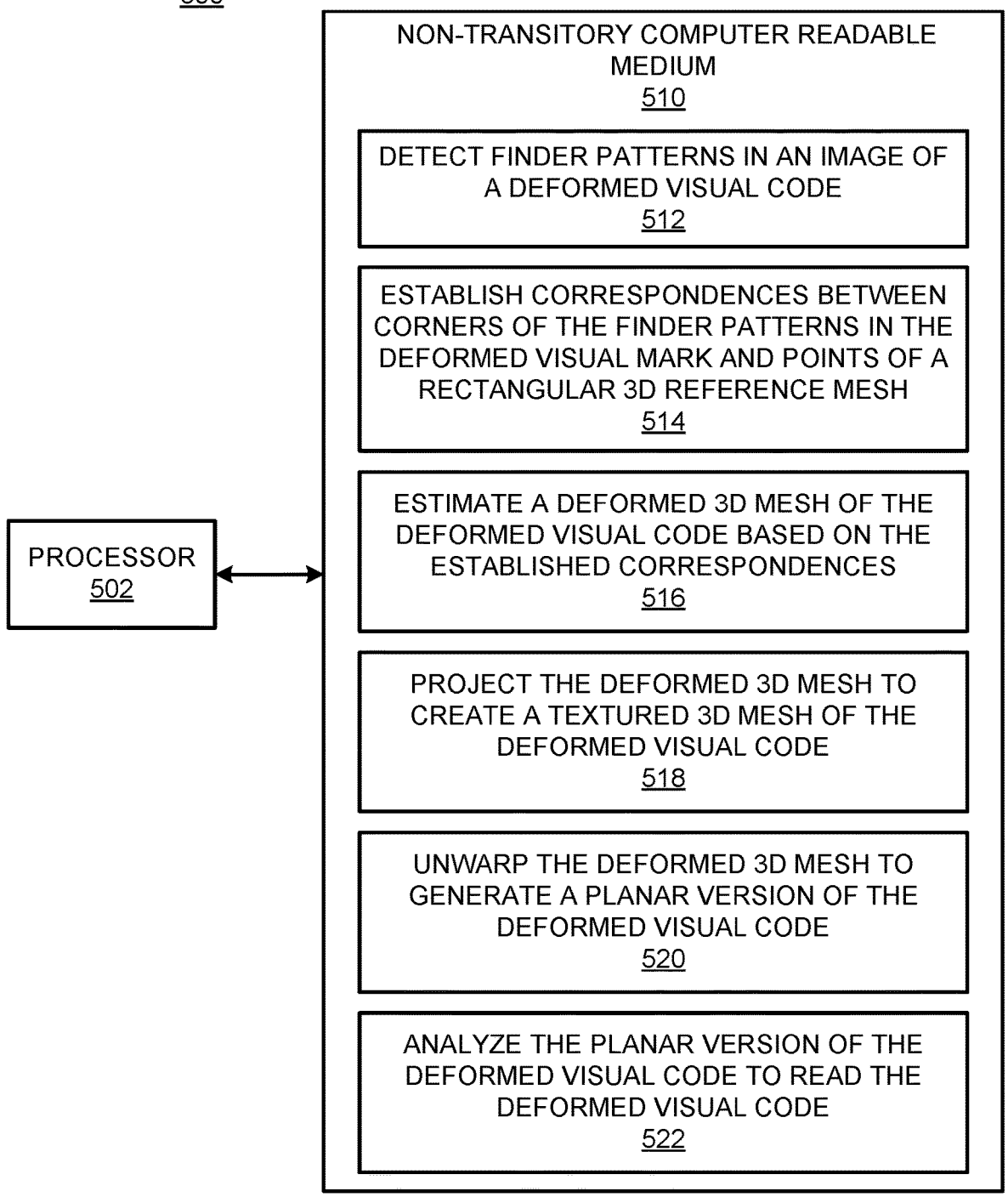
FIG. 5 shows a block diagram of an example apparatus that may process an image of a deformed visual code to read information encoded in the deformed visual code.
Figure 6:
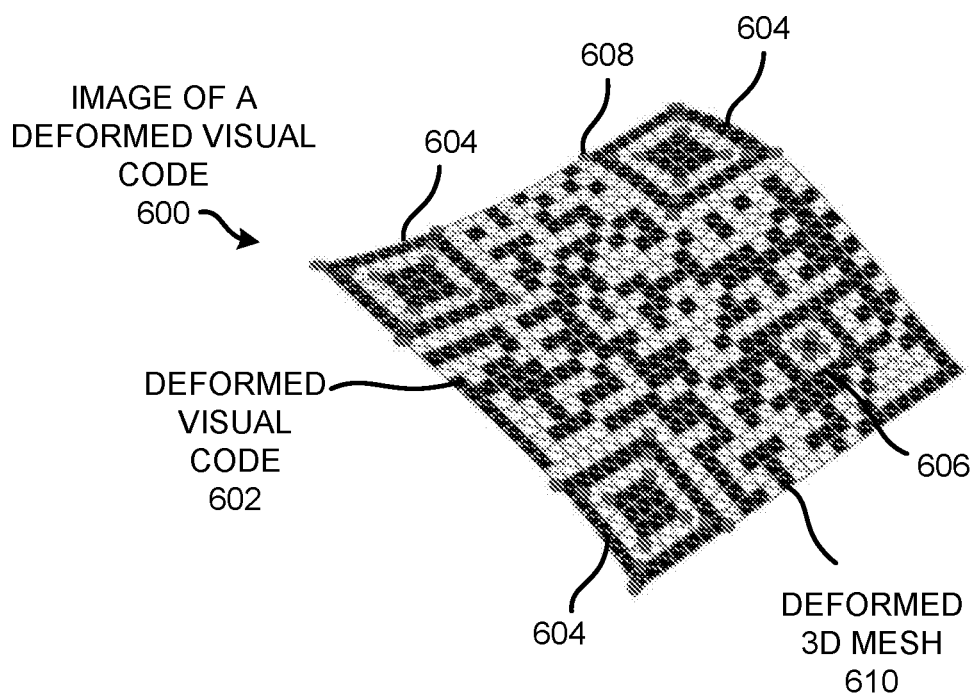
FIG. 6 shows a diagram of an example image of a deformed visual code with a deformed mesh overlaying the image.

Reference is now made to FIGS. 5 and 6. FIG. 5 shows a block diagram of an example apparatus 500 that may process an image 600 of a deformed visual code 602 to read information encoded in the deformed visual code 602. FIG. 6 shows a diagram of an example image 600 of a deformed visual code 602 with a deformed mesh 610 overlaying the image 600. It should be understood that the apparatus 500 depicted in FIG. 5 and the image 600 of the deformed visual code 602 depicted in FIG. 6 may include additional components and that some of the components described herein may be removed and/or modified without departing from the scopes of the apparatus 500 disclosed herein.

The apparatus 500 may be a computing apparatus, similar to the apparatus 100 depicted in FIG. 1. As shown in FIG. 5, the apparatus 500 may include a processor 502 that may control operations of the apparatus 500. The processor 502 may be similar to the processor 102 depicted in FIG. 1. The apparatus 500 may also include a non-transitory computer readable medium 510 that may have stored thereon machine readable instructions 512-522 (which may also be termed computer readable instructions) that the processor 502 may execute. The non-transitory computer readable medium 510 may be similar to the non-transitory computer readable medium 110 depicted in FIG. 1.

According to examples in which the deformed visual code 602 is a quick response (QR) code as shown in FIG. 6, the deformed visual code 602 may include a plurality of finder patterns 604. In a flat version of the deformed visual code 602, the finder patterns 604 may have the same patterns and sizes with respect to each other and may be positioned at or near the edges of the QR code. The finder patterns 604 may each have respective sets of corners 608 as denoted by the dots shown in FIG. 6, in which some of the corners 608 of the finder patterns 604 may define the boundaries of the QR code. In addition, each of the finder patterns 604 may include a smaller square element surrounded by a larger square element, with a gap between the elements. In some examples, the QR code may also include an alignment pattern 606 positioned near a corner of the QR code at which the finder patterns 604 are not provided. The alignment pattern 606 may also include a smaller square element surrounded by a larger square element, with a gap between the elements. The QR code may further include patterns that may represent various information.

The processor 502 may fetch, decode, and execute the instructions 512 to detect the finder patterns 604 in an image 600 of a deformed visual code 602, each of the finder patterns 604 including a respective set of corners 608. As shown in FIG. 6, each of the finder patterns 604 may include 12 corners. In addition, the deformed visual code 602 may have an arbitrary deformation, e.g., not a cylindrical or round deformation. The processor 502 may detect the finder patterns 602 and the corners 608 in any of the manners discussed above with respect to the processor 102.

The processor 502 may fetch, decode, and execute the instructions 514 to establish correspondences between the corners 608 of the finder patterns 604 and points of a planar 2-dimensional (2D) reference mesh (not shown). The planar 2D reference mesh may be a triangular mesh that may be sized according to a detected size of the deformed visual code 602. That is, the size of the planar 2D reference mesh may be based on a size of the deformed visual code 602, as may be calculated from the sizes and locations of the finder patterns 604 in the image 600. In addition, the processor 502 may calculate coordinate positions of the corners 608 of the finder patterns 604 with respect to points, e.g., intersections of the vertices of the 2D reference mesh. By way of example, the processor 502 may relate each of the corners 608 of the finder patterns 604 to coordinates of the 2D reference mesh.

The processor 502 may fetch, decode, and execute the instructions 516 to estimate a deformed 3D mesh 610 of the deformed visual code 602 based on the established correspondences. For instance, the processor 502 may estimate the deformed 3D mesh of the deformed visual code 602 through use of the Laplacian mesh method based on the established correspondences.

The processor 502 may fetch, decode, and execute the instructions 518 to project the deformed 3D mesh on top of the deformed visual code 602 in the image 600 to create a textured 3D mesh of the deformed visual code 602. In addition, the processor 502 may unwarp the deformed 3D mesh 602 to generate a planar version of the deformed visual code 602. Moreover, the processor 502 may analyze the planar version of the deformed visual code 602 to read the deformed visual code 602.

Figure 7:
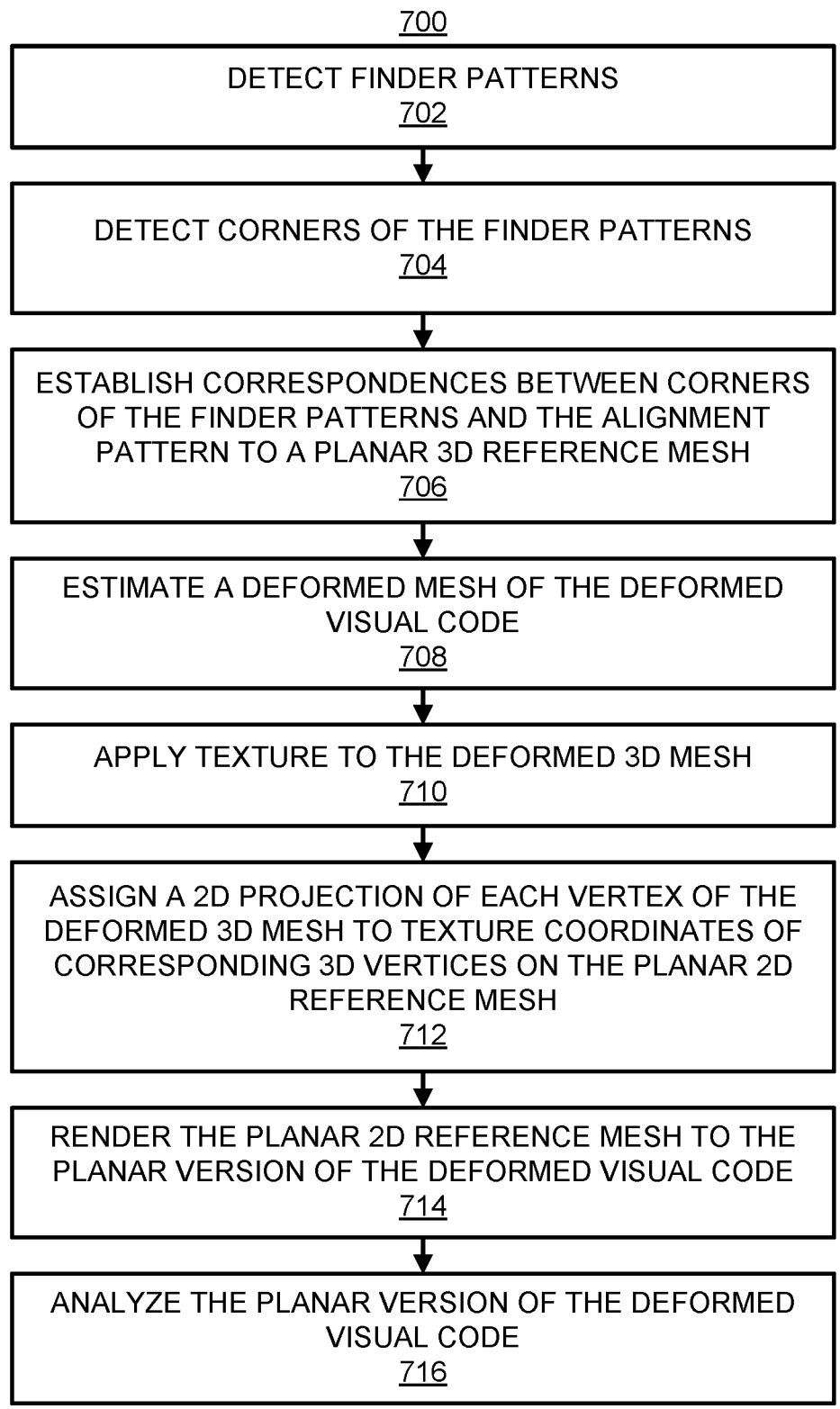
FIG. 7 depicts an example method for processing an image of a deformed visual code to read information encoded in the deformed visual code.

Various manners in which the processor 502 may be implemented are discussed in greater detail with respect to the method 700 depicted in FIG. 7. Particularly, FIG. 7 depicts an example method 700 for processing an image 600 of a deformed visual code 602 to read information encoded in the deformed visual code 602. It should be apparent to those of ordinary skill in the art that the method 700 may represent a generalized illustration and that other operations may be added or existing operations may be removed, modified, or rearranged without departing from the scope of the method 700.

The description of the method 700 is made with reference to the apparatus 500 illustrated in FIG. 5 as well as to the features depicted in FIG. 6 for purposes of illustration. It should be understood that apparatuses having configurations other than that shown in FIG. 5 may be implemented to perform the method 700 without departing from the scope of the method 700.

At block 702, the processor 502 may detect finder patterns 604 in an image 600 of a deformed visual code 604, each of the finder patterns 604 including a respective set of corners 608. At block 704, the processor 502 may detect the corners 608 of the finder patterns. In some examples, at block 702, the processor 502 may also detect an alignment pattern 606 and at block 704, the processor 502 may detect the corners 608 of the alignment pattern.

At block 706, the processor 502 may establish correspondences between the corners 608 of the finder patterns 604 and points of a planar 2-dimensional (2D) reference mesh. At block 708, the processor 502 may estimate a deformed 3D mesh 610 of the deformed visual code 602 based on the established correspondences. At block 710, the processor 502 may apply texture to the deformed 3D mesh 610. At block 712, the processor 502 may assign a 2D projection of each vertex of the deformed 3D mesh 610 to texture coordinates of corresponding 3D vertices on the planar 2D reference mesh.

At block 714, the processor 502 may render the planar 2D reference mesh to the planar version of the deformed visual code. For instance, the processor 502 may render the planar 2D reference mesh to the planar version of the deformed visual code 602 using a graphics pipeline with texturing enabled. At block 716, the processor 502 may analyze the planar version of the deformed visual code 602 to read the deformed visual code 602.

Figure 8:
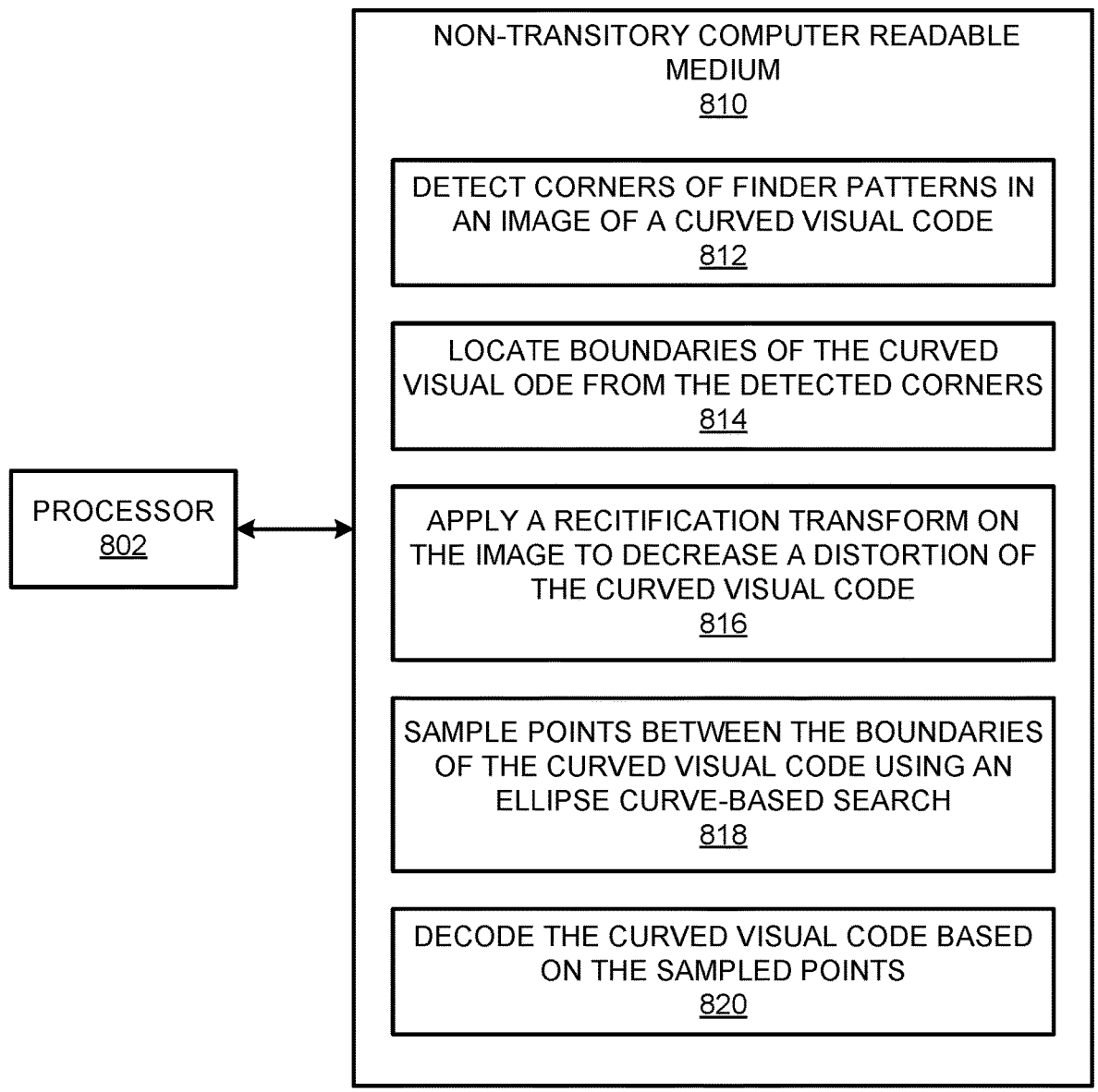
FIG. 8 shows a block diagram of an example apparatus that may process an image of a curved visual code to read information encoded in the curved visual code.
Figure 9A:
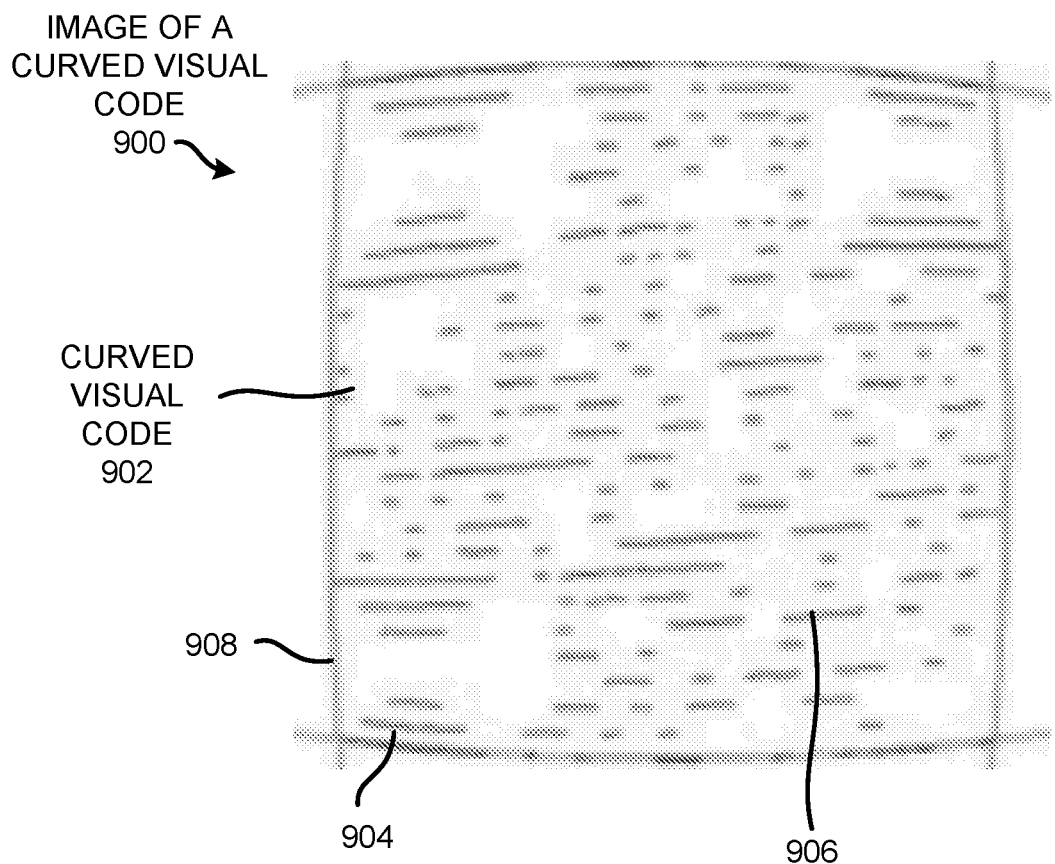
FIG. 9A shows a diagram of an example image of a curved visual code following preprocessing of the image.

Reference is now made to FIGS. 8 and 9A. FIG. 8 shows a block diagram of an example apparatus 800 that may process an image 900 of a curved visual code 902 to read information encoded in the curved visual code 902. FIG. 9A shows a diagram of an example image 900 of a curved visual code 902 following preprocessing of the image 900. It should be understood that the apparatus 800 depicted in FIG. 8 and the image 900 of the curved visual code 902 depicted in FIG. 9A may include additional components and that some of the components described herein may be removed and/or modified without departing from the scopes of the apparatus 500 disclosed herein.

The apparatus 800 may be a computing apparatus, similar to either or both of the apparatuses 100, 500 respectively depicted in FIGS. 1 and 5. As shown in FIG. 8, the apparatus 800 may include a processor 802 that may control operations of the apparatus 800. The processor 802 may be similar to either or both of the processors 102, 502 respectively depicted in FIGS. 1 and 5. The apparatus 800 may also include a non-transitory computer readable medium 810 that may have stored thereon machine readable instructions 812-820 (which may also be termed computer readable instructions) that the processor 802 may execute. The non-transitory computer readable medium 810 may be similar to either or both of the non-transitory computer readable mediums 110 and 510 respectively depicted in FIGS. 1 and 5.

The curved visual code 902 may be preprocessed version of the curved visual mark 202 depicted in FIG. 2A and may include a plurality of finder patterns 904. In a flat version of the deformed visual code 902, the finder patterns 904 may have the same patterns and sizes with respect to each other and may be positioned at or near the edges of the QR code. The finder patterns 904 may each have respective sets of corners, in which some of the corners of the finder patterns 904 may define the boundaries of the QR code. The QR code may further include patterns that may represent various information.

The processor 802 may fetch, decode, and execute the instructions 812 to detect corners of finder patterns 904 in an image 900 of the curved visual code 902. The processor 802 may detect the corners of the finder patterns 904 in any of the manners discussed herein. The processor 802 may fetch, decode, and execute the instructions 814 to locate boundaries 908 of the curved visual code 902 from the detected corners of the finder patterns 904. That is, the processor 802 may locate the boundaries 908 as laying at the outermost corners of the detected finder patterns 904.

The processor 802 may fetch, decode, and execute the instructions 816 to apply a rectification transform on the image 900 of the curved visual code 902 to decrease a distortion of the curved visual code 902. The processor 802 may fetch, decode, and execute the instructions 818 to sample points between the located boundaries 908 of the curved visual code 902 using an ellipse curve-based search, in which each of the sampled points corresponds to a cell of the curved visual code 902. The processor 802 may fetch, decode, and execute the instructions 820 to decode the curved visual code 902 based on the sampled points.

Figure 10:
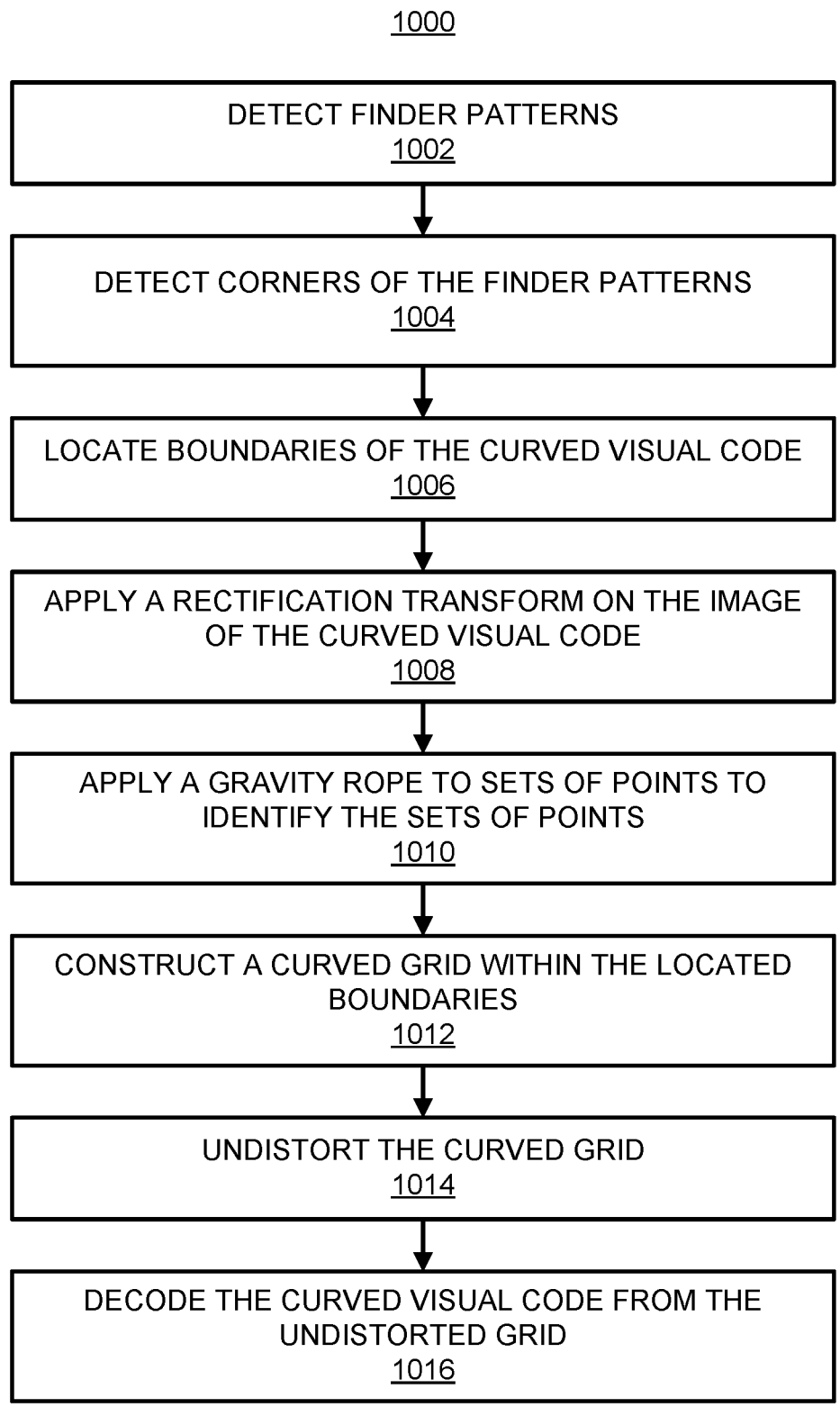
FIG. 10 depicts an example method for processing an image of a curved visual code to read information encoded in the curved visual code.

Various manners in which the processor 802 may be implemented are discussed in greater detail with respect to the method 1000 depicted in FIG. 10. Particularly, FIG. 10 depicts an example method 1000 for processing an image 900 of a curved visual code 902 to read information encoded in the curved visual code 902. It should be apparent to those of ordinary skill in the art that the method 1000 may represent a generalized illustration and that other operations may be added or existing operations may be removed, modified, or rearranged without departing from the scope of the method 1000.

The description of the method 1000 is made with reference to the apparatus 800 illustrated in FIG. 8 as well as to the features depicted in FIG. 9 for purposes of illustration. It should be understood that apparatuses having configurations other than that shown in FIG. 8 may be implemented to perform the method 1000 without departing from the scope of the method 1000.

At block 1002, the processor 802 may detect the finder patterns 904 and the alignment pattern 906 in the image 900 of the curved visual code 902. The processor 802 may detect the finder patterns 904 through any suitable detection technique as discussed herein. For instance, the processor 802 may preprocess an image 900 of the curved visual code 902 with RGB conversion and thresholding.

At block 1004, the processor 802 may detect corners of the finder patterns 904 in the image 900 of the curved visual code 902. At block 1006, the processor 802 may locate boundaries 908 of the curved visual code 902. At block 1008, the processor 802 may apply a rectification transform on the image of the curved visual code 902.

At block 1010, the processor 802 may apply a gravity rope to sets of points in the image 900 of the curved visual code 902 to identify the sets of points. Particularly, for instance, the processor 802 may find the points of the curved visual code 902 that a virtual rope contacts as the virtual rope is dropped from a top of the curved visual code 902. Thus, for instance, the gravity rope may contact a first set of points shown in FIG. 9 that are located at an uppermost position of curved visual code 902 and those points may be identified as being located along a common line. The first set of points may be removed and the gravity rope may contact a second set of points that are located at the remaining uppermost position of the curved visual code 902 to identify the second set of points. The processor 802 may repeat this process to identify the sets of points along the remaining lines of the curved visual code 902.

In addition, or in other examples, the processor 802 may identify the sets points in a direction other than from top to bottom. In these examples, the processor 802 may identify the sets from a side of the curved visual code 902 and/or from a bottom to the top of the curved visual code 902. In some examples, the processor 802 may combine the results from the searches in the different directions to find common points and testing the different possibilities found.

Figure 9B:
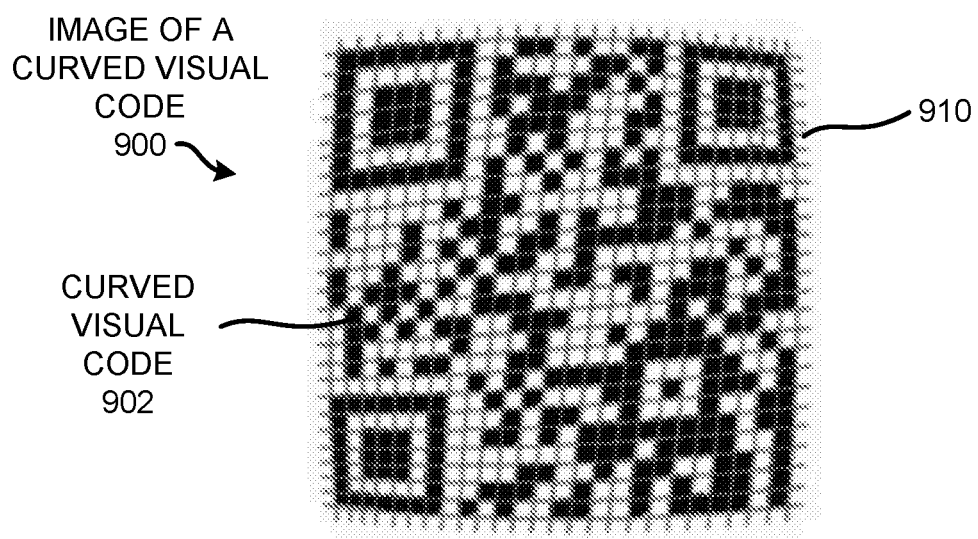
FIG. 9B shows a diagram of an example curved grid laid over the image of the curved visual code shown in FIG. 9A.

At block 1012, the processor 802 may construct a curved grid 910 within the located boundaries 908 of the curved visual code 902. An example curved grid 910 laid over the image 900 of the curved visual code 902 is depicted in FIG. 9B. According to examples, the curved grid 910 may be reconstructed to match the curvature of the curved visual code 902 based on curves (defined as segments of ellipses) that fit the identified sets of boundary points in the curved visual code 902. In addition, at block 1014, the processor 802 may undistort the curved visual code 902, e.g., the curved grid. That is, for instance, the processor 802 may flatten the curved grid 910 and the image 900 to undistort the curved visual code 902. In addition, at block 1016, the processor 802 may decode the curved visual code 902 from the undistorted curved grid.

According to examples, a processor 102, 502, 802 may select one or a combination of the techniques disclosed herein to read a curved or deformed visual code 202, 602, 902. For instance, the processor 102, 502, 802 may perform each of the techniques on the same curved visual code 202, 602, 902 and may compare error levels of the results of each of the techniques. In these examples, the processor 102, 502, 802 may select the read code information from the technique that resulted in the lowest error level. In addition or alternatively, the processor 102, 502, 802 may employ the technique that is best suited for the type of distortion applied to the visual curved visual code 202, 602, 902. For instance, in instances in which the curved visual code 202, 602, 902 is curved in a cylindrical or spherical contour, the processor 102, 502, 802 may select the technique disclosed herein with respect to FIGS. 1-4C. However, in instances in which the curved visual code 202, 602, 902 is deformed in other manners, the processor 102, 502, 802 may select the technique disclosed with respect to FIGS. 5-7.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that when executed by the processor, are to cause the processor to:
   create a two-dimensional (2D) reference mesh for an image of a curved visual mark;
   establish correspondences between finder pattern points in the curved visual mark and points of the 2D reference mesh;
   determine a curved three-dimensional (3D) mesh having a radius that results in a minimal reprojection error of a projective transform estimated for correspondences between the 2D reference mesh and the curved 3D mesh while the radius remains below a predefined upper limit;
   sample components of the curved visual mark in elements of the determined curved 3D mesh to form a 2D planar image of the curved visual mark; and
   analyze the 2D planar image of the curved visual mark to read the curved visual mark.

2. The apparatus of claim 1, wherein the curved visual mark includes finder patterns, each of the finder patterns including respective finder pattern points, and wherein the instructions are further to cause the processor to:
   detect the finder patterns in the image of the curved visual mark;
   detect the finder pattern points of the detected finder patterns;
   estimate a grid around the curved visual mark based on the detected finder pattern points of the finder patterns; and
   create the 2D reference mesh based on the estimated grid.

3. The apparatus of claim 2, wherein the instructions are further to cause the processor to:
   estimate a N×N grid size of the curved visual mark based on sizes of the detected finder patterns;
   create the 2D reference mesh based on the estimated N×N grid size of the curved visual mark; and
   calculate coordinate positions of the finder pattern points with respect to points of the 2D reference mesh.

4. The apparatus of claim 3, wherein the instructions are further to cause the processor to:
   generate a 3D reference mesh based on the 2D reference mesh, the 3D reference mesh having a first radius;
   establish correspondences between the 2D reference mesh and the 3D reference mesh;
   estimate a 2D-3D projective transform from the established correspondences between the 2D reference mesh and the 3D reference mesh;
   calculate a reprojection error regarding the estimated 2D-3D projective transform;
   determine whether the calculated reprojection error is lower than an initial projective transform error for the 2D reference mesh; and
   based on a determination that the calculated reprojection error is lower than a current best reprojection error,
   set the radius of the 3D reference mesh as the current best reprojection error;
   increment a candidate radius by a predefined value;
   determine whether the incremented candidate radius is lower than an upper limit; and
   based on the incremented candidate radius being lower than the upper limit, generate a next 3D reference mesh using the incremented candidate radius.

5. The apparatus of claim 4, wherein the instructions are further to cause the processor to:
   establish correspondences between the 2D reference mesh and the next 3D reference mesh;
   estimate a second 2D-3D projective transform from the established correspondences between the 2D reference mesh and the next 3D reference mesh;
   calculate a second reprojection error regarding the second estimated 2D-3D projective transform;
   determine whether the second calculated reprojection error is lower than the second calculated reprojection error; and
   based on a determination that the second calculated reprojection error is lower than the calculated reprojection error, set the radius of the next 3D reference mesh as the radius of the determined curved 3D mesh.

6. The apparatus of claim 4, wherein the instructions are further to cause the processor to:
   based on a determination that the calculated reprojection error is not lower than the best reprojection error,
   define a candidate radius to equal the radius corresponding to the current best reprojection error subtracted by the predefined value;
   define the upper limit to equal the radius corresponding to the current best reprojection error;
   divide the predefined value by two; and
   determine whether the predefined value divided by two is below a certain value.

7. The apparatus of claim 6, wherein the instructions are further to cause the processor to:
   based on a determination that the predefined value divided by two is below the certain value, generate a next 3D reference mesh using the defined candidate radius;
   establish correspondences between the 2D reference mesh and the next 3D reference mesh;

estimate a second 2D-3D projective transform from the established correspondences between the 2D reference mesh and the next 3D reference mesh;

calculate a second reprojection error regarding the second estimated 2D-3D projective transform;

determine whether the second calculated reprojection error is lower than the second calculated reprojection error; and based on a determination that the second calculated reprojection error is lower than the calculated reprojection error, set the radius of the next 3D reference mesh as the radius of the determined curved 3D mesh.

8. The apparatus of claim 1, wherein the curved visual mark comprises a curved quick response code.

9. A method comprising:

detecting, by a processor, finder patterns in an image of a deformed visual code, each of the finder patterns including a respective set of corners;

establishing, by the processor, correspondences between the corners of the finder patterns and points of a planar 2-dimensional (2D) reference mesh;

estimating, by the processor, a deformed 3D mesh of the deformed visual code based on the established correspondences;

projecting, by the processor, the deformed 3D mesh on top of the deformed visual code to create a textured 3D mesh of the deformed visual code;

unwarping the deformed 3D mesh to generate a planar version of the deformed visual code; and analyzing the planar version of the deformed visual code to read the deformed visual code.

10. The method of claim 9, wherein unwarping the deformed 3D mesh further comprises:

assigning a 2D projection of each vertex of the deformed 3D mesh to texture coordinates of corresponding 3D vertices on the planar 2D reference mesh; and rendering the planar 2D reference mesh to the planar version of the deformed visual code.

11. The method of claim 10, wherein rendering the planar 2D reference mesh to the planar version of the deformed visual code further comprises rendering the planar 2D reference mesh to the planar version of the deformed visual code using a graphics pipeline with texturing enabled.

12. The method of claim 9, further comprising using a Laplacian mesh method to estimate the deformed 3D mesh.

13. A non-transitory computer readable medium on which is stored machine readable instructions that when executed by a processor are to cause the processor to:

create a two-dimensional (2D) reference mesh for an image of a curved visual mark;

establish correspondences between finder pattern points in the curved visual mark and points of the 2D reference mesh;

determine a curved three-dimensional (3D) mesh having a radius that results in a minimal reprojection error of a projective transform estimated for correspondences between the 2D reference mesh and the curved 3D mesh while the radius remains below a predefined upper limit;

sample components of the curved visual mark in elements of the determined curved 3D mesh to form a 2D planar image of the curved visual mark; and analyze the 2D planar image of the curved visual mark to read the curved visual mark.

14. The non-transitory computer readable medium of claim 13, wherein the curved visual mark includes finder patterns, each of the finder patterns including respective finder pattern points, and wherein the instructions are further to cause the processor to:

detect the finder patterns in the image of the curved visual mark;

detect the finder pattern points of the detected finder patterns;

estimate a grid around the curved visual mark based on the detected finder pattern points of the finder patterns; and create the 2D reference mesh based on the estimated grid.

15. The non-transitory computer readable medium of claim 14, wherein the instructions are further to cause the processor to:

estimate a N×N grid size of the curved visual mark based on sizes of the detected finder patterns;

create the 2D reference mesh based on the estimated N×N grid size of the curved visual mark; and calculate coordinate positions of the finder pattern points with respect to points of the 2D reference mesh.

16. The non-transitory computer readable medium of claim 15, wherein the instructions are further to cause the processor to:

generate a 3D reference mesh based on the 2D reference mesh, the 3D reference mesh having a first radius;

establish correspondences between the 2D reference mesh and the 3D reference mesh;

estimate a 2D-3D projective transform from the established correspondences between the 2D reference mesh and the 3D reference mesh;

calculate a reprojection error regarding the estimated 2D-3D projective transform;

determine whether the calculated reprojection error is lower than an initial projective transform error for the 2D reference mesh; and based on a determination that the calculated reprojection error is lower than a current best reprojection error,
set the radius of the 3D reference mesh as the current best reprojection error;
increment a candidate radius by a predefined value;
determine whether the incremented candidate radius is lower than an upper limit; and
based on the incremented candidate radius being lower than the upper limit, generate a next 3D reference mesh using the incremented candidate radius.

17. The non-transitory computer readable medium of claim 16, wherein the instructions are further to cause the processor to:

establish correspondences between the 2D reference mesh and the next 3D reference mesh;

estimate a second 2D-3D projective transform from the established correspondences between the 2D reference mesh and the next 3D reference mesh;

calculate a second reprojection error regarding the second estimated 2D-3D projective transform;

determine whether the second calculated reprojection error is lower than the second calculated reprojection error; and based on a determination that the second calculated reprojection error is lower than the calculated reprojection error, set the radius of the next 3D reference mesh as the radius of the determined curved 3D mesh.

18. The non-transitory computer readable medium of claim 16, wherein the instructions are further to cause the processor to:

based on a determination that the calculated reprojection error is not lower than the best reprojection error, define a candidate radius to equal the radius corresponding to the current best reprojection error subtracted by the predefined value;
define the upper limit to equal the radius corresponding to the current best reprojection error;
divide the predefined value by two; and
determine whether the predefined value divided by two is below a certain value.

19. The non-transitory computer readable medium of claim 18, wherein the instructions are further to cause the processor to:
based on a determination that the predefined value divided by two is below the certain value, generate a next 3D reference mesh using the defined candidate radius;
establish correspondences between the 2D reference mesh and the next 3D reference mesh;
estimate a second 2D-3D projective transform from the established correspondences between the 2D reference mesh and the next 3D reference mesh;
calculate a second reprojection error regarding the second estimated 2D-3D projective transform;
determine whether the second calculated reprojection error is lower than the second calculated reprojection error; and
based on a determination that the second calculated reprojection error is lower than the calculated reprojection error, set the radius of the next 3D reference mesh as the radius of the determined curved 3D mesh.

20. The non-transitory computer readable medium of claim 13, wherein the curved visual mark comprises a curved quick response code.

\* \* \* \* \*